(12) United States Patent
Wilson

(10) Patent No.: US 9,950,457 B2
(45) Date of Patent: Apr. 24, 2018

(54) GATE DESIGN WITH CONCENTRIC CHANNEL FOR SEPARATING OFF-RATIO MATERIAL

(71) Applicant: Brian D Wilson, Greer, SC (US)

(72) Inventor: Brian D Wilson, Greer, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 28 days.

(21) Appl. No.: 14/776,073

(22) PCT Filed: Mar. 14, 2013

(86) PCT No.: PCT/US2013/031629
§ 371 (c)(1),
(2) Date: Sep. 14, 2015

(87) PCT Pub. No.: WO2014/158126
PCT Pub. Date: Oct. 2, 2014

(65) Prior Publication Data
US 2016/0059457 A1 Mar. 3, 2016

(51) Int. Cl.
*B29C 45/27* (2006.01)
*B29D 30/02* (2006.01)
(Continued)

(52) U.S. Cl.
CPC ...... *B29C 45/2708* (2013.01); *B29C 33/0038* (2013.01); *B29C 33/0055* (2013.01);
(Continued)

(58) Field of Classification Search
CPC ........ B29C 2045/0041; B29C 45/2701; B29C 45/2703; B29C 33/0055; B29C 33/0061;
(Continued)

(56) References Cited

U.S. PATENT DOCUMENTS 2,878,517 A * 3/1959 Cramer ............... B29C 45/2616
249/107
3,339,239 A * 9/1967 Peck ....................... B29C 45/26
249/110
(Continued)

FOREIGN PATENT DOCUMENTS

DE 2141278 * 9/1972
GB 1130520 A 10/1968
(Continued)

OTHER PUBLICATIONS

Electronic translation JP 60-120023.*
International Search Report with written opinion dated May 30, 2013.

*Primary Examiner* — Jill L Heitbrink
(74) *Attorney, Agent, or Firm* — John Steckler Schwab

(57) ABSTRACT

This invention relates generally to an apparatus for casting a portion of a tire or other article of manufacture, and, more specifically, to an apparatus that has a gate design that has a circular runner and concentric channel or waste reservoir for separating off-ratio material before it enters the cavity that forms a portion of the fire or oilier article of manufacture. The design may further include a passage that connects the runner to the waste reservoir as well as an air vent that allows trapped gas or air to exit the waste reservoir as it fills with waste material, a valve that Is operative!)' associated with the passage for closing and opening the passage at appropriate times, and a nozzle for initially introducing material into the waste reservoir and subsequently into runner.

10 Claims, 15 Drawing Sheets

(51) Int. Cl.

| | | |
|---|---|---|
| *B29C 45/34* | (2006.01) | |
| *B29C 45/26* | (2006.01) | |
| *B29C 33/00* | (2006.01) | |
| *B29D 30/06* | (2006.01) | |
| *B29C 33/10* | (2006.01) | |
| *B29C 33/30* | (2006.01) | |
| *B29C 39/00* | (2006.01) | |
| *B29C 39/24* | (2006.01) | |
| *B29C 39/26* | (2006.01) | |
| *B29K 75/00* | (2006.01) | |
| *B29L 30/00* | (2006.01) | |
| *B29C 45/00* | (2006.01) | |
| *B60C 7/00* | (2006.01) | |
| *B60C 7/14* | (2006.01) | |

(52) U.S. Cl.
CPC ...... *B29C 33/0061* (2013.01); *B29C 33/0077* (2013.01); *B29C 33/10* (2013.01); *B29C 33/302* (2013.01); *B29C 39/006* (2013.01); *B29C 39/24* (2013.01); *B29C 39/26* (2013.01); *B29C 45/2669* (2013.01); *B29C 45/34* (2013.01); *B29D 30/02* (2013.01); *B29D 30/0678* (2013.01); B29C 2045/0041 (2013.01); B29C 2045/2671 (2013.01); B29K 2075/00 (2013.01); B29L 2030/006 (2013.01); B60C 2007/005 (2013.01); B60C 2007/146 (2013.01)

(58) Field of Classification Search
CPC ... B29C 33/0077; B29C 33/10; B29C 39/006; B29C 39/26; B29C 45/2708; B29C 2045/2671; B29C 33/0038; B29C 33/302; B29C 39/24; B29C 45/2669; B29C 45/2803; B29C 45/34
See application file for complete search history.

(56) References Cited

U.S. PATENT DOCUMENTS

| | | | | |
|---|---|---|---|---|
| 3,550,207 | A | * 12/1970 | Strauss | B29C 45/1753 425/156 |
| 4,012,025 | A | * 3/1977 | Ernst | B29C 33/0061 249/105 |
| 4,135,180 | A | * 1/1979 | White | B01F 5/0602 264/DIG. 83 |
| 4,252,294 | A | 2/1981 | Uchio | |
| 4,257,994 | A | 3/1981 | Leblanc et al. | |
| 5,605,707 | A | * 2/1997 | Ibar | B29C 33/565 425/144 |
| 5,798,127 | A | 8/1998 | Thayer et al. | |
| 7,393,479 | B2 | * 7/2008 | Mai | B29C 45/1753 264/328.1 |
| 2002/0117783 | A1 | 8/2002 | Thomas | |
| 2005/0205181 | A1 | 9/2005 | Forney et al. | |
| 2012/0018927 | A1 | 1/2012 | Watanabe | |

FOREIGN PATENT DOCUMENTS

| | | |
|---|---|---|
| GB | 1213869 | * 11/1970 |
| JP | 54-162768 | * 12/1979 |
| JP | 60-120023 | * 6/1985 |
| JP | 60-206611 | * 10/1985 |
| JP | 2006-805614 | * 10/2006 |

* cited by examiner

GATE DESIGN WITH CONCENTRIC CHANNEL FOR SEPARATING OFF-RATIO MATERIAL

BACKGROUND OF THE INVENTION

Field of the Invention

This invention relates generally to an apparatus for casting a portion of a the or other article of manufacture, and, more specifically, to an apparatus that has a gate design that has a circular runner and concentric channel or waste reservoir for separating off-ratio material before it enters the cavity that forms a portion of the tire or other article of manufacture. The design may further include a passage that connects the runner to the waste reservoir as well as an air vent that allows trapped gas or air to exit the waste reservoir as it fills with waste material, a valve that is operatively associated with the passage for closing and opening the passage at appropriate times, and a nozzle for initially introducing material into the waste reservoir and subsequently into the runner.

Description of the Related Art

An emerging field in tire development involves the manufacture and use of non-pneumatic or hybrid tires that do not depend solely on gas to support the tire structurally as these tires are not prone to deflation, which can render standard pneumatic tires inoperable, An example of such a tire is disclosed by U.S. Pat. No. 7,201,194, which is commonly owned by the applicant of the present application. The content of this patent is incorporated herein by reference for all purposes hi its entirety. In an exemplary embodiment of the '194 patent, the nom-pneumatic tire includes an outer annular shear band and a plurality of web spokes that extend transversely across and radially inward from the annular shear band and are anchored in a wheel or hub. In certain embodiments, the annular shear band may further comprise a shear layer, at least a first membrane adhered to the radially inward extent of the shear layer and at least a second membrane adhered to the radially outward extent of the shear layer. In addition to the ability to operate without a required inflation pressure, the invention of U.S. Pat. No. 7,201,194 also provides advantages that include as more uniform ground contact pressure throughout the length of the contact area. Hence, this tire mimics the performance of a pneumatic tire.

FIG. 1 shows such a tire that defines a radial direction R. For reference, all the reference numerals, in the 100's used herein refer to the tire features while all reference numerals in the 200's used herein refer to a molding apparatus for making such a tire and reference numerals in the 300's used herein refer to features of a gate, runner and waste reservoir design according to a first embodiment of the present invention and reference numerals in the 400's used herein refer to a features of a second embodiment of the present invention. The tire 100 comprises a tread 102 that is attached to the outward extent 104 of the spokes 106, which in turn, are connected to a hub or wheel 108 at their inward extent 110 by means known in the art such as by molding spokes between the hub 108 and the tread 102, which have been prepared for suitable bonding to the polyurethane. An outer annular band 105 is located between the outward extent of the spokes and the tread and an inner annular band 107 is found at the inward extent of the spokes, connecting them together. This inner annular band 107 can be used to attach the tire to a hub or wheel.

For the version of the tire 100 shown, the annular bands 105, 107 and spokes 106 are formed by pouring a polyurethane liquid into a rotational mold where the liquid is spread via centrifugation and then cured or hardened (see published patent application WO 2012094005 A1 for an example). It can also be seen that the spokes 106 are grouped in pairs and that the individual spokes 106', 106" within each pair are consistently spaced from each other and that each pair is spaced consistently from the adjacent pair around the circumference of the tire. The spacing within each pair and the spacing between each adjacent pair do not need to be the same. As described by the Abstract and col. 2, lines 28-41 of the '194 patent, the spokes 106 support the tire 100 in tension near the top of the tire 100 and not in compression. Instead, the spokes 106 at the bottom of the tire near the contact patch, which is where the tread 102 of the tire 100 contacts the road, compress or buckle easily. This helps the tire to simulate the pneumatic support function of a pneumatic tire.

Due to the sensitive and important function that the annular bands 105, 107 serve, i.e. to create the bond between the tread and the hub or wheel, as well as aesthetic concerns, it is desirable that the thickness of the bands remain constant. Looking at FIG. 2, mold cores 238" found on a bottom mold half 234 are shown that form the spokes and inside surfaces 101 of the annular bands. These mold cores are drafted on the surfaces 237 that form the spokes themselves as mold cores coming from one side of the mold interarticulate with similarly configured mold cores coming from the other half so that the thickness of the spokes can remain constant even if there is draft present. However, these mold cores are undrafted on the surfaces 235 that form the inside surfaces of the annular bands. In the case of the inside surface of the outer annular band 105, the inside surface of the tread is substantially cylindrical, requiring that the inside surface of the outer annular band also be cylindrical to maintain the thickness of the annular band and to avoid aesthetic inconsistencies on the outer annular band from one side of the tire to the other. A similar situation exists for the inside annular band.

Due to the structural requirements of the spokes and the annular bands, it is preferable that they be aimed without bubbles, sinks, voids, or other molding or casting defects as these can deleteriously affect the performance of the tire. Also, it is desirable that the quality of the polyurethane that forms these portions of the tire be good so that once cured, these structures do not fail when the tire is used. In other words, the tire's spoke structure and annular bands require that all the polyurethane used in these areas meets minimum properties. Polyurethane dispensed from most commercially available machines or mixheads today inherently output initially some amount of poor quality or off-ratio material for a short period of time at the beginning of the shot. This results in the initial part of the shot being discarded. Typically, this is done by dispensing the material into a separate container outside of the mold and then while dispensing, moving the injection nozzle back over the mold cavity, which can be messy.

Additionally, when using low pressure mixheads, as the mixhead is moved after dispensing a shot, there is a problem with dripping polyurethane as the mixhead moves away from the mold. This happens since these mixheads have nozzles that are gravity fed and that lack a shutoff valve. In applications where there is some type of valve associated with the mixhead that is used for filling the mold, such as when a ball valve is employed, the flow is momentarily stopped or dead headed, resulting in disruption in the flow, which causes metering inaccuracy of the dispensing machine. That is to say, the ratio of material components is undesirably impacted and thus inaccurate.

Yet another problem with using commercially available injection systems is that when the gate is below the final level of polyurethane, as is the case when a bottom fill scheme is used, there is a need to prevent backflow from the mold cavity through the gate and back through the feed system.

Accordingly, it is desirable to find an apparatus and method that allows such tires or other articles of manufacture to be made using a feed system that allows polyurethane or other material to be fed into a mold cavity after the poor quality material has been separated and discarded without necessitating movement of the mixhead, dripping of the material or any other type of mess. It would be particularly useful if such an apparatus and method could be designed that prevented backflow through the gate after the mold cavity has been filled. Finally, it would be ideal if the proposed apparatus and method could be used with rotational or non-relational casting or molding.

SUMMARY OF THE INVENTION

Particular embodiments of the present invention include an apparatus for molding or casting an article of manufacture that has a mold cavity and a feed system for filling the mold cavity with a fluid material. The feed system may have structural members that define a series of voids including a waste reservoir, a runner, a passage that connects the waste reservoir to the runner, allowing fluid communication between the waste reservoir and the runner. An injection point may also be provided for introducing fluid into the waste reservoir as well as a gate that provides fluid communication between the runner and the mold cavity.

In some cases, the void volume of the passage is less than that of the waste reservoir, runner, or both. In most cases, the injection point houses a shut off nozzle.

In other embodiments, the linear distance from the injection point taken along the flow path of the waste reservoir from the injection point to the passage is less than or equal to the linear distance from the passage to the end of the waste reservoir taken along the flow path of the waste reservoir. In some cases, the distance from the injection point to the passage is at least half the distance from the passage to the end of the waste reservoir.

In further embodiments, the runner and gate have annular configurations both of which rotate about a central axis. In some cases, these annular configurations make complete 360 degree revolutions about the central axis. Similarly, the waste reservoir may also have an annular configuration that rotates about a central axis and it may make at least a 270 degree rotation but less than a 360 degree rotation about the central axis. The central axis for the gate, runner and waste reservoir may be the same or all three voids.

Particular embodiments of the present invention include method for manufacturing an article comprising the step of providing an apparatus with structural members that define voids including a mold cavity and a feed system. The feed system may include an injection point, waste reservoir, a runner, a passage that connects the waste reservoir to the runner, and a gate that connects the runner to the mold cavity. The method may further comprise the steps of injecting fluid material into the waste reservoir until it is partially filled and then stopping the filling of the waste reservoir before it is completely filled. A control system that is capable of receiving, processing and sending signals may also be provided. Signals may be sent to the control system by sensors, which generate the signals after certain events have occurred, and signals may be sent by the control system to valves for controlling their opening and closing.

In certain embodiments, the method may further comprise the step of providing fluid communication between the waste reservoir and the runner before the waste reservoir has been completely filled. In many instances, the reservoir will have been mostly filled. Sensors may generate a signal when the waste reservoir has been partially filled a suitable amount meaning that only good material is flowing pass the passage that leads to the runner. A signal may be then sent to a valve associated with the air vent that is in communication with the waste reservoir for closing the valve. About the same time, the valve associated with the passage may be opened to create fluid communication between the waste reservoir and the runner. In some cases, the valve to the passage is opened before the valve to the air vent is closed to help prevent flow hesitation.

Similarly in other embodiments, the method may further comprise the step of generating a signal that indicates when the mold cavity is filled. Then, the valve associated with the passage may be shut off to prevent flow back from the mold cavity into the gate and the feed system in general. Also, a shut off nuzzle may be provided that is housed or placed into the injection point. This nozzle may be shut off after the valve associated with the passage has been closed. Then the fluid material found in the molding cavity for making the article as well as the material found in the feed system may be hardened and cured. Finally, the hardened or cured article or hardened or cured feed system may be removed from the apparatus.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Figure 1:
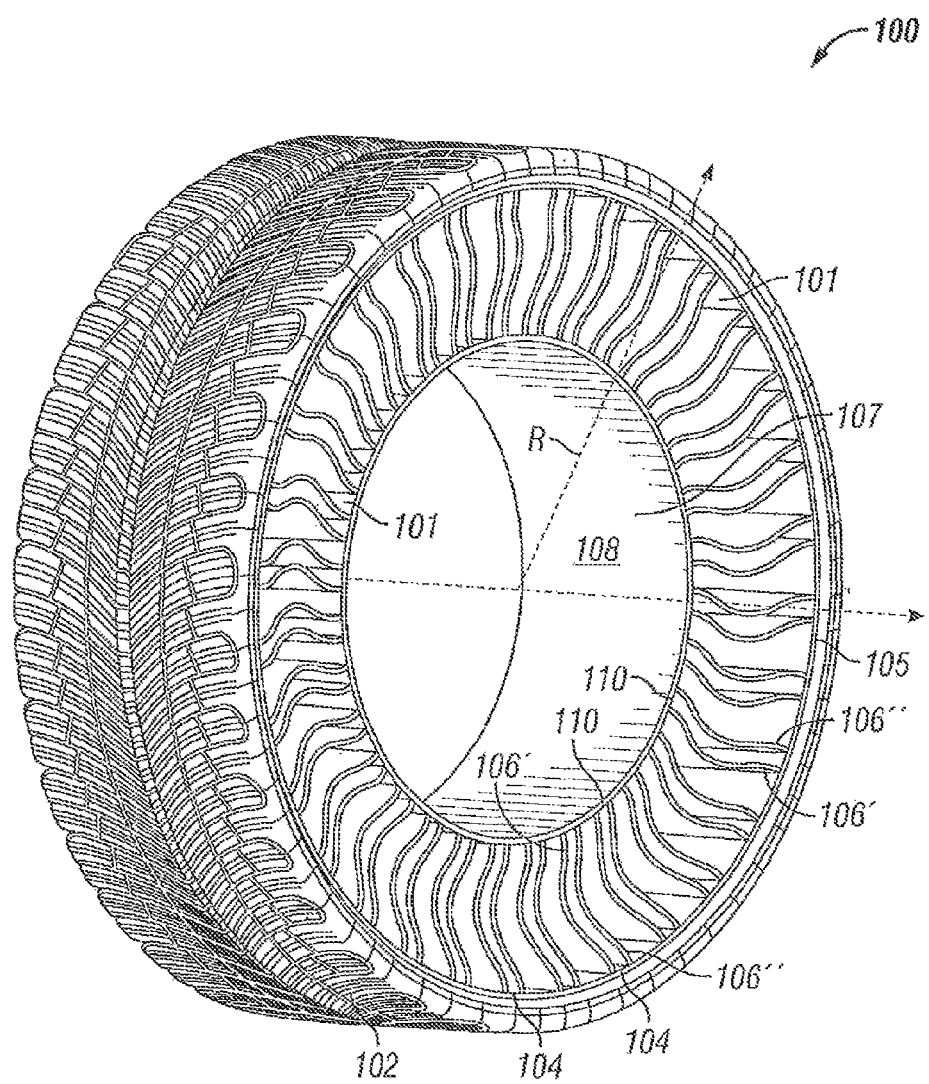
FIG. 1 is a perspective view of a non-pneumatic tire that has spokes that can be molded using an apparatus according to an embodiment of the present invention.
Figure 2:
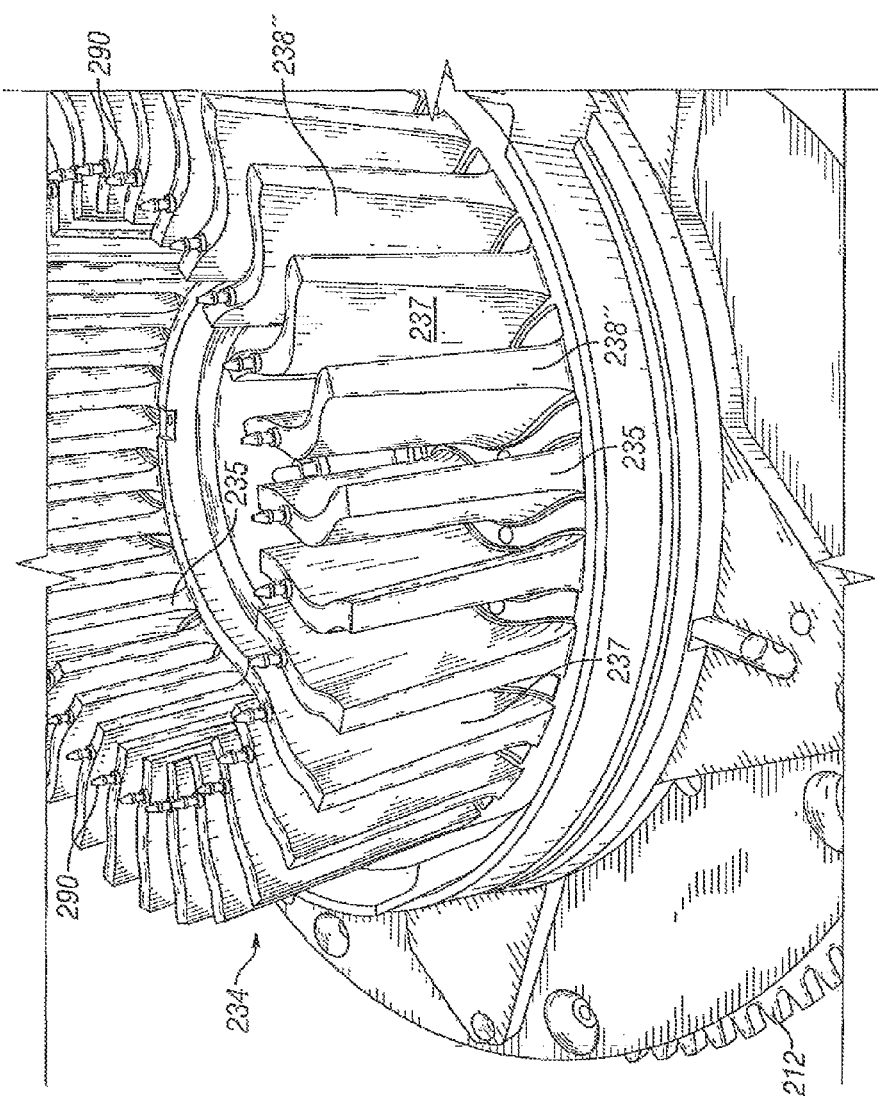
FIG. 2 is a perspective view of a mold half and associated cores that form the spokes of the tire of FIG. 1.
Figure 3:
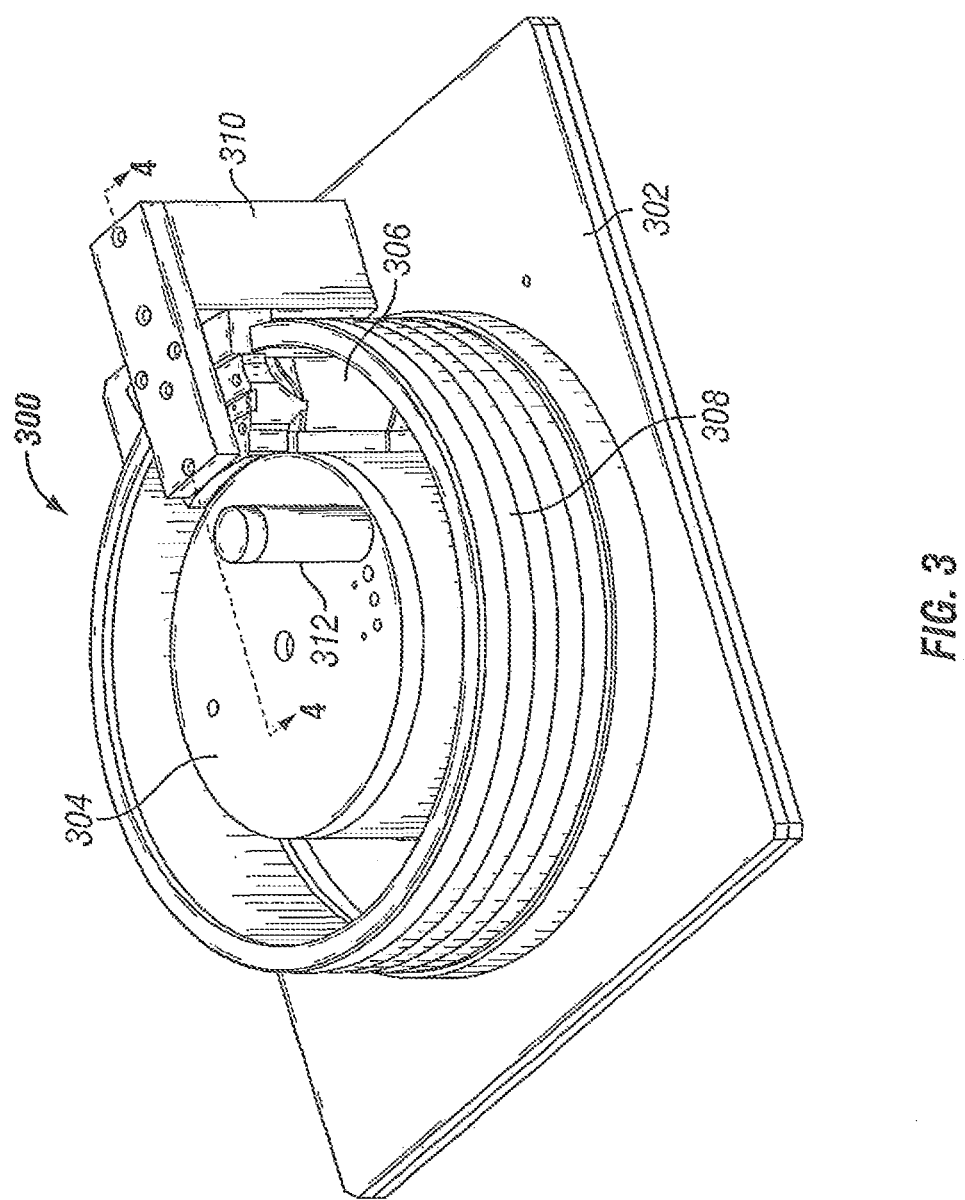
FIG. 3 is a perspective view of a testing apparatus employing a method and apparatus according to a first embodiment of the present invention.

Looking at FIG. 3, a perspective view of a testing apparatus 300 that employs a method and apparatus according to one embodiment of the present invention can be clearly seen that proves out the invention to form only five spokes as shown and described above with reference to FIGS. 1 and 2. It comprises a platform 302, a central hub 304 that helps to form the inner annular band that connects the spokes of the tire, a sector of a mold 306 that has interarticulating cores for feinting the inside surfaces of the spokes, and an annular skirt 308 that forms the outer annular band that also connects the spokes of the tire. The central hub, mold sector and annular skirt are connected to the platform. A right angle arm 310 is used to attach the mold cores that extend downwardly for forming the spokes to the platform while the mold cores that extend upwardly are attached directly to the platform 302 as is more clearly seen in FIG. 4. A portion of the valve assembly 312 is also shown extending from the central hub 304 that selectively opens and closes a passage that connects the waste reservoir to the runner of the feed system as will be described further later. This testing apparatus does not spin or rotate, but it is contemplated that it could be used in conjunction with molding or casting equipment that rotates about any axis or about multiple axes.

Figure 4:
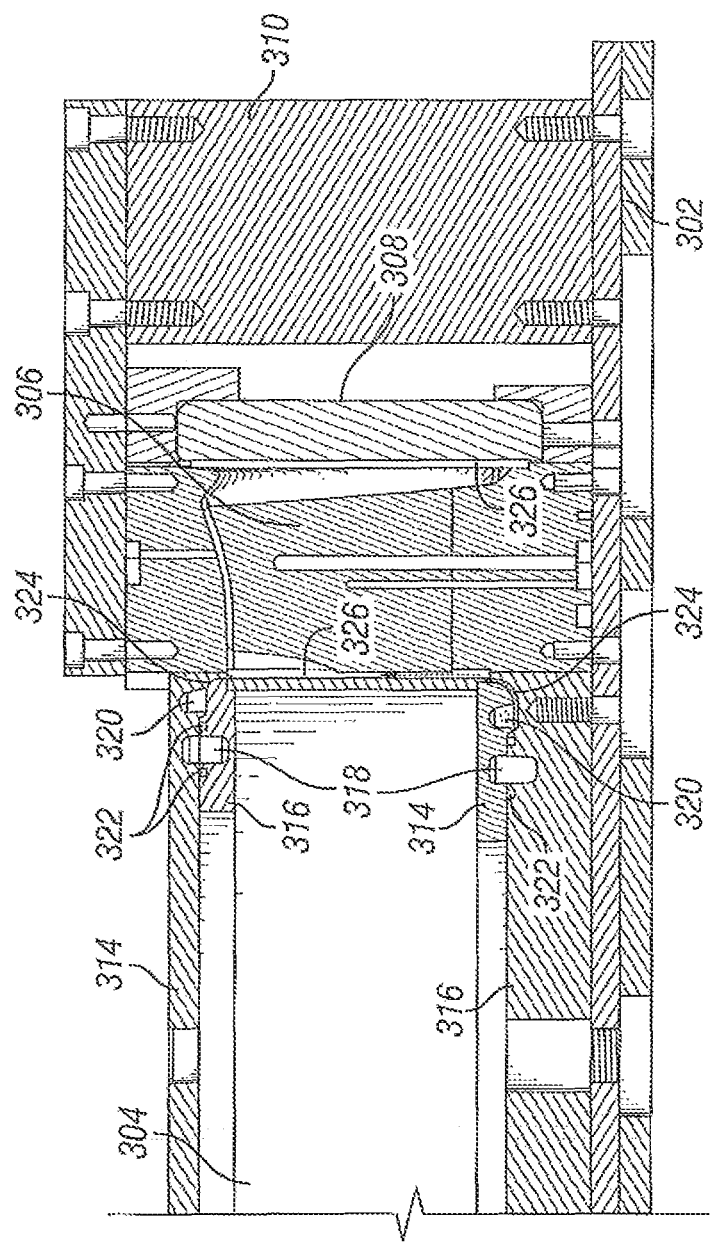
FIG. 4 is an enlarged sectional view of the waste reservoir, runner and gate of the first embodiment of the present invention taken along lines 4-4 of FIG. 3, showing the flow of material from the runner through the gate into the mold cavity.

FIG. 4 is a sectional view taken along lines 4-4 of FIG. 3, depicting the locations of the feed system relative to the cores that form the spokes as well as the cavities that form the inner annular band and outer annular baud of the tire. The tied system is shown to have both top fill and bottom fill options and it is contemplated that either could be used or that both could be used simultaneously or in some sort of timed fashion. The feed system for both the top fill and bottom fill options comprises two members that are split relative to each other. The first member 314 has a portion of the waste reservoir or channel 318 machined into it as well as the runner 320. The second member 316 as the remaining portion of the reservoir 318 machined on it as well as the o-ring or gasket grooves 322 that prevent leaking of the polyurethane between theses member. Preferably, the o-ring or gasket grooves are machined onto the lower member to allow placement of the o-ring or gaskets therein, thereby easing assembly. The feed system further includes as thin gap between the members that serves as the gate 324. All the features of the feed system including the waste reservoir, runner and gate extend substantially around the circular perimeter of the hub, allowing the mold cavity 326 to be filled substantially in an annular fashion as will be better described later. The arrows illustrate this flow from the tamer into the cavity of the mold through the gate.

Figure 5:
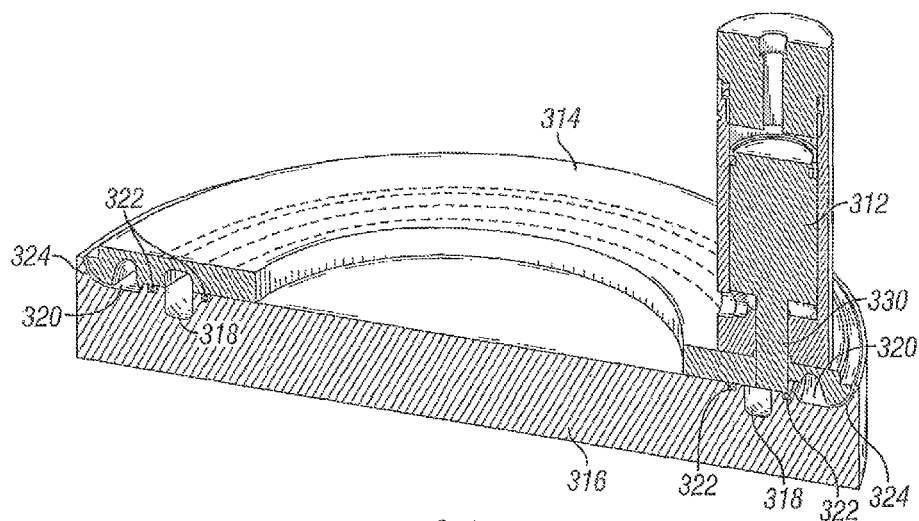
FIG. 5 is perspective view taken from FIG. 4 with only the shut off valve assembly that closes the passage connecting the waste reservoir to the runner and gate that is defined by the upper and lower members shown the clarity.

Turning now to FIG. 5, a perspective sectional view of the first or upper member 314, second or lower member 316 of the feed system of the bottom fill option shown in FIG. 4, as well as the valve assembly 312 is depicted. The upper member 314 is shown in a translucent state so that the runner 320 and gate 324 can be seen as dashed lines to extend completely around the circular perimeter of half the upper member. The waste reservoir 318 can be seen to be a channel, that is concentric with the runner and gate and that is found radially inside of these features and does not extend completely around the circular perimeter of the upper member (best seen in FIG. 6). The valve assembly 312 can be seen to be of a conventional plunger design that is powered by pneumatic or hydraulic means. Alternatively, the valve could be powered by a solenoid. Other typos of valves could be used including ball valves nm other valves that rotate open and close. It is further contemplated that the valve could use some sort of membrane, similar to that shown and described with respect to a feature of the second embodiment of the present invention that will be discussed later. The function of the valve is to open and close the passage 328 from the waste reservoir to the runner as will be discussed next with respect to FIG. 6.

Figure 6:
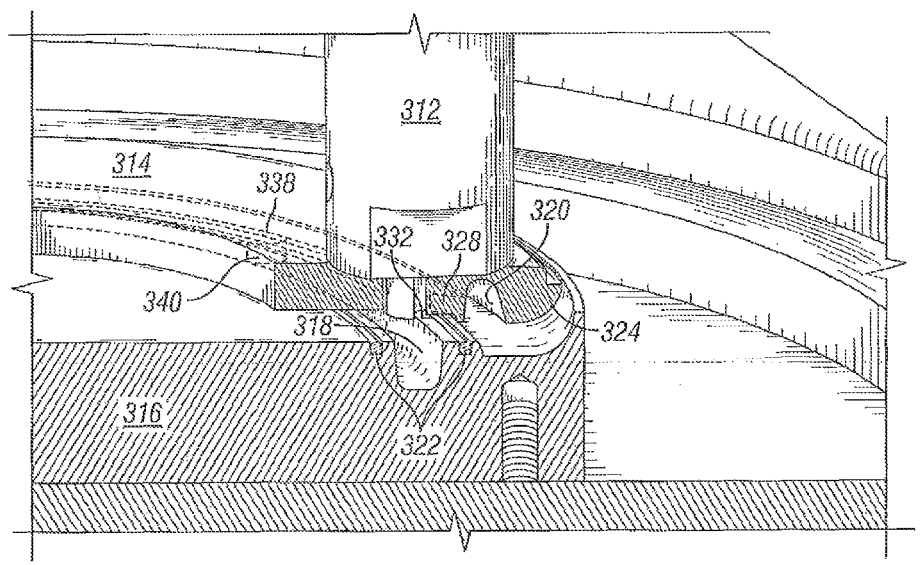
FIG. 6 is an enlarged view of FIG. 5 showing the passage connecting the waste reservoir to the runner and the passage valve shutting off on a ridge or gasket more clearly.
Figure 7:
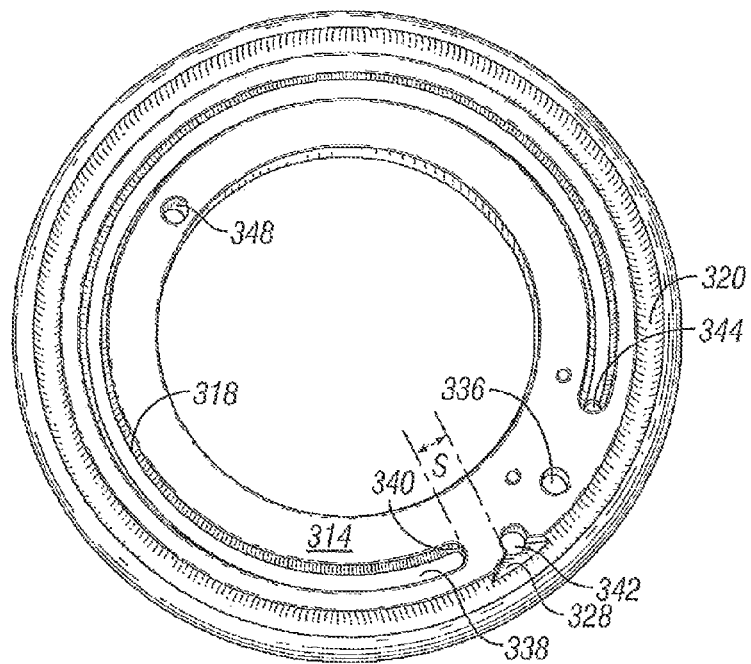
FIG. 7 is a perspective view of the upper member of FIG. 5 showing the runner and fan shaped passage that are machined on it.
Figure 8:
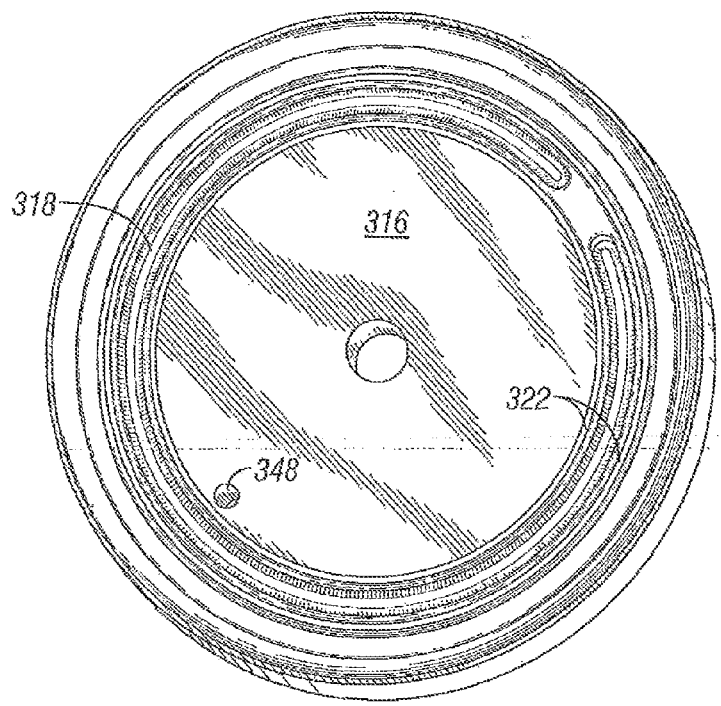
FIG. 8 is a perspective view of the lower member of FIG. 5 showing the waste reservoir and gasket channels machined on it.

Focusing now on FIG. 6, it can be seen that this particular valve assembly has a shut off stem 330 that impinges upon the ridge 332 that separates the outer o-ring or gasket channel and waste reservoir. A portion of the shut off stem 330 may also shut of on the o-ring or gasket itself depending on the design. Furthermore, it can be seen that the upper portion of the waste reservoir that is found on the upper member of the feed system starts a predetermined distance away 334 from the valve assembly that opens and closes the passage between the waste reservoir and the runner. Looking at FIGS. 7 and 8, the construction of the upper and lower members 314, 316 can be seen more clearly that house the feed system and it can be also seen that the passage 32 that leads from the waste reservoir 318 to the runner 320 has a fan shape. Looking at FIGS. 6 and 7, the passage is below the top surface 338 of the waste reservoir and is spaced away a predetermined distance S from the surface 340 that extends downwardly at a right angle from the top surface. These surfaces act as gas or bubble catchers, helping to prevent trapped air or gas that resulted as the waste reservoir filled from entering the passage and contaminating the material that flows through runner and will eventually enter the mold cavity via the gate. Note that only a portion of the aperture 336 that contains the injection nozzle or other means for injecting material into the feed reservoir is shown.

Figure 9:
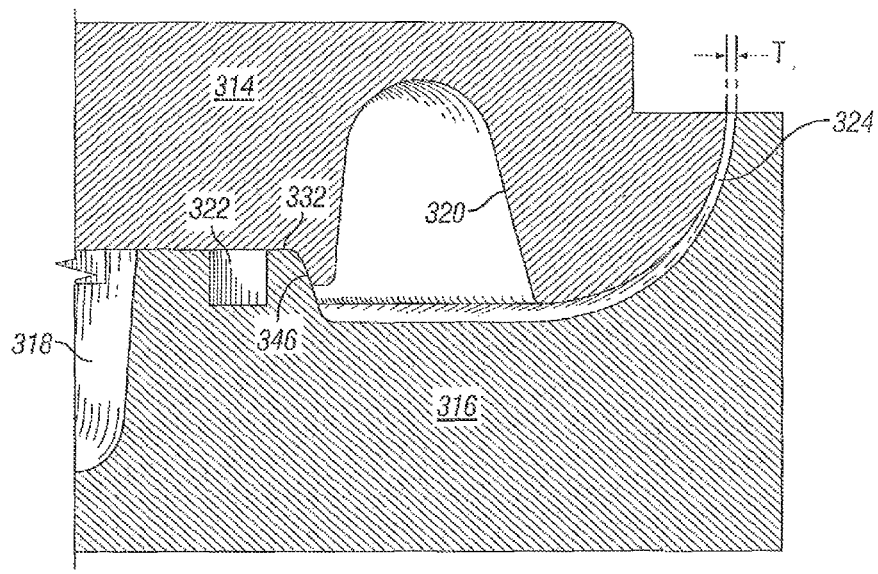
FIG. 9 is an enlarged sectional view of the upper and lower members showing the gate defined by these members in more detail.

FIG. 9 shows up close the gate and that is has a thickness that funnels down to a final thickness T of 0.5 min and that it curves away from the runner, which is in the upward direction for the bottom fill scenario as illustrated here and in the downward direction for the top fill scenario, into the bottom or top surface respectively of the cavity that forms the inner annular band of the tire. The stepped split line 346 helps center the upper member 314 to the lower member 316 while orientation holes 348 along with a dowel pin helps establish the proper angular orientation between the upper and lower members.

Figure 10:
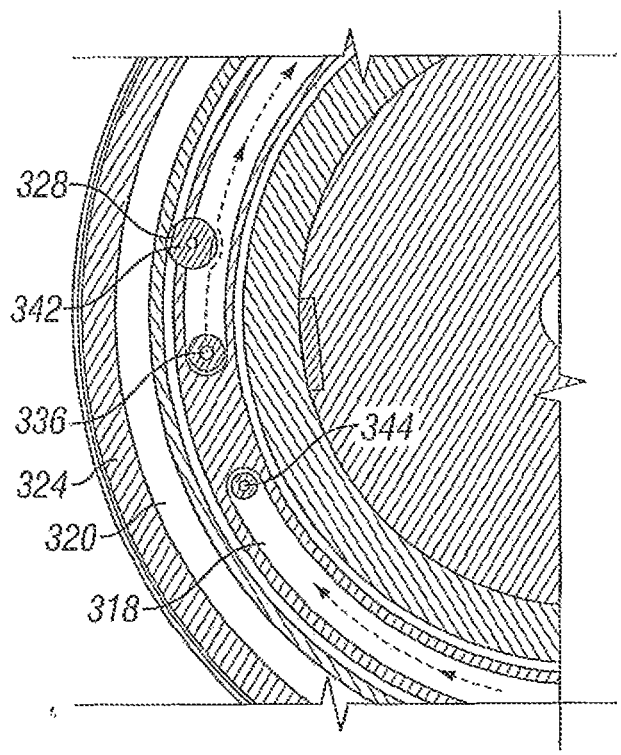
FIG. 10 is a partial sectional view of the first embodiment of the present invention taken along a radial plane of the testing apparatus showing the filling of the waste reservoir until bad material has been purged from the injection apparatus.
Figure 11:
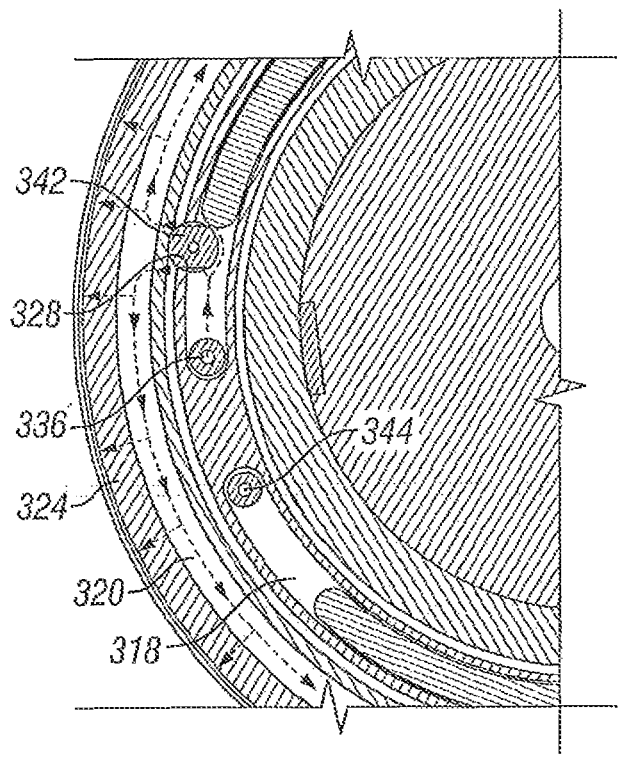
FIG. 11 is the partial sectional view of FIG. 10 after the air vent that is in fluid communication with the waste reservoir has been closed, causing a hydrostatic buildup of pressure that causes material to flow into the passage and pass its shut off valve that has been opened, allowing the runner, gate and mold cavity to fill with material sequentially.

FIGS. 10 and 11 are partial top sectional views showing the feed system, allowing one skilled in the art to ace the relative placements of the injection point 336 for introducing material into the feed system, valve 342 for opening and closing the passage 328 found between the waste reservoir 318 and the runner 320, and the air vent 344 located at the end of the waste reservoir. The air vent can comprise any simple valve known in the art or could also comprise a porous medium that allows air to pass through but not the material itself, such as is commonly used in the injection molding industry. The injection of the material may be accomplished by using injection nozzles used in the art including those that use a compression seal or tapered seal.

Alternatively, the injection nozzle may be of similar construction as that will be described later with respect to the second embodiment of the invention. Various forms of the valve assembly that can be used for opening and closing the passage between the waste reservoir for holding the off-ratio material and the runner have already been discussed. It is contemplated that this valve assembly may be omitted in certain cases provided that passage way is sized appropriately so that waste material will not enter the runner prematurely until good material is introduced into the starting portion of the waste reservoir. Such a design may be particularly suitable for top fill situations or other scenarios where flow back once the mold cavity is filled will not be a problem. In most cases, it is preferable to have a valve assembly to help ensure poor quality material does not enter the runner and to prevent back flow once the mold cavity has been filled.

Now focusing on FIG. 10, the initial filling of the waste reservoir 318 is represented by the arrows. First, the material is injected into the waste reservoir and the air vent 344 is opened. This step may include opening a valve associated with a nozzle found at the injection point 336 and may include previously shutting off the valve 342 located between the waste reservoir 318 and the runner 320. The material continues to fill the waste reservoir until enough of the material has filled the waste reservoir that allows one skilled in the art to be confident that poor quality material has passed the passage between the runner and the waste reservoir so that it will not enter eventually into the mold cavity. Once enough initial material has entered into the waste reservoir, the air vent 344 is closed and the 342 valve found between the waste reservoir 318 and the runner 320, if one is present, is opened. This causes a pressure buildup to occur in the waste reservoir so that no more material flows in the waste reservoir and the runner begins to fill.

In some cases, the valve 342 between the waste channel 318 and the runner 320 is opened previous to the closing of the air vent 344 and in other cases the air vent lacks a valve and so there is no closing of the vent. It is preferable to open the valve between the waste reservoir and the channel before closing the air vent to avoid flow hesitation. As shown by the terminal point of the arrows, the timing of this is done to help ensure that the material does not reach the air vent 344, which could potentially foul the vent and prevent it from working in future cycles or shots of the manufacturing process.

For this embodiment, the timing of filling and stopping the flow of material into the waste reservoir is achieved by using a timer. The inventor has calculated the amount of time necessary to fill the waste reservoir with 100 g of material but may vary depending on the application. It is contemplated that the timing could be triggered by using other means known in the art including pressure switches, temperature sensors, and capacitance sensors. Regarding the use of temperature sensors, the inventor notes that the typical mold temperature is 100 C. and the temperature of the polyurethane 80 C. So, if the sensor is initially detecting the air temperature, then an increase in temperature may be used to shut off the air vent valve and/or to open the valve that allows material to flow into the runner. On the other hand, if the sensor is initially detecting the mold temperature, then a decrease in temperature may be used to shut off the air vent valve and/or to open the valve that allows material to flow into the runner.

Turning now to FIG. 11, the process of filling the runner 320, gate 324 and subsequently, the mold cavity is illustrated. After the valve 342 is opened leading to the runner 320 and the air vent 344 is closed, good material flows into the runner completely along its circular periphery as hydrostatic pressure (represented by the cross-hatched area in FIG. 11) causes material to no longer flow pass the passage 328. As the gate is greatly restricted compared to the runner, little to no material flows into the cavity until the entire runner is filled, at which point the material will flow into the cavity in essentially an annular fashion along the entire circumference of the tire. Alter the material in the mold cavity, gate, runner, passage and waste reservoir 318 has been cured or hardened, the tire and attached feed system are removed from the molding apparatus were the gate is trimmed so that the feed system is detached from the tire. For the testing apparatus, this needs to be done manually, however, it is contemplated that the members that form the feed system would be opened automatically and the part and feed system would be removed or ejected automatically as is commonly done in the injection molding industry so that the process could be done without manual intervention. At approximately the same time, the nozzle that injects the material into the feed system would be flushed with solvent over a drum to get it ready for the next cycle or shot.

Adjustments may be made to this embodiment of the invention depending on the application. For instance, the length, placement, size and configuration including the flow paths as well as cross-sectional shapes of the gate, runner, waste reservoir and passage between the waste reservoir and the runner may be adjusted as desired as well as how they are defined or machined into structural members that house the void that forms the feed system. Likewise, the relevant placement of these features to each other as well as in what structural members they are located may be modified. In most cases, the passage between the runner and waste reservoir is located closer to the injection point than to the end of the waste reservoir. In fact, in most applications the linear distance from the passage to the end of the waste reservoir, which is where the air vent is typically found, is at least twice the linear distance from the injection point to the passage along the flow path, allowing a significant material to be held in the waste reservoir to help ensure poor quality material does not make it into the runner and later into the mold cavity via the gate. Similarly, the runner, gate and waste reservoir do not need to have curved flow paths but may be altered depending on the application or shape of the article to be manufactured and could be straight or flow along any desired flow path.

It is further contemplated that a shut off valve may be used that is located just past the passage along the flow path of the waste reservoir to shut off the flow to the waste reservoir once the bad material has passed the passage. In such a case, the shut off valve that is operatively associated with the air vent that is in fluid communication with the waste reservoir may be unnecessary.

Figure 12:
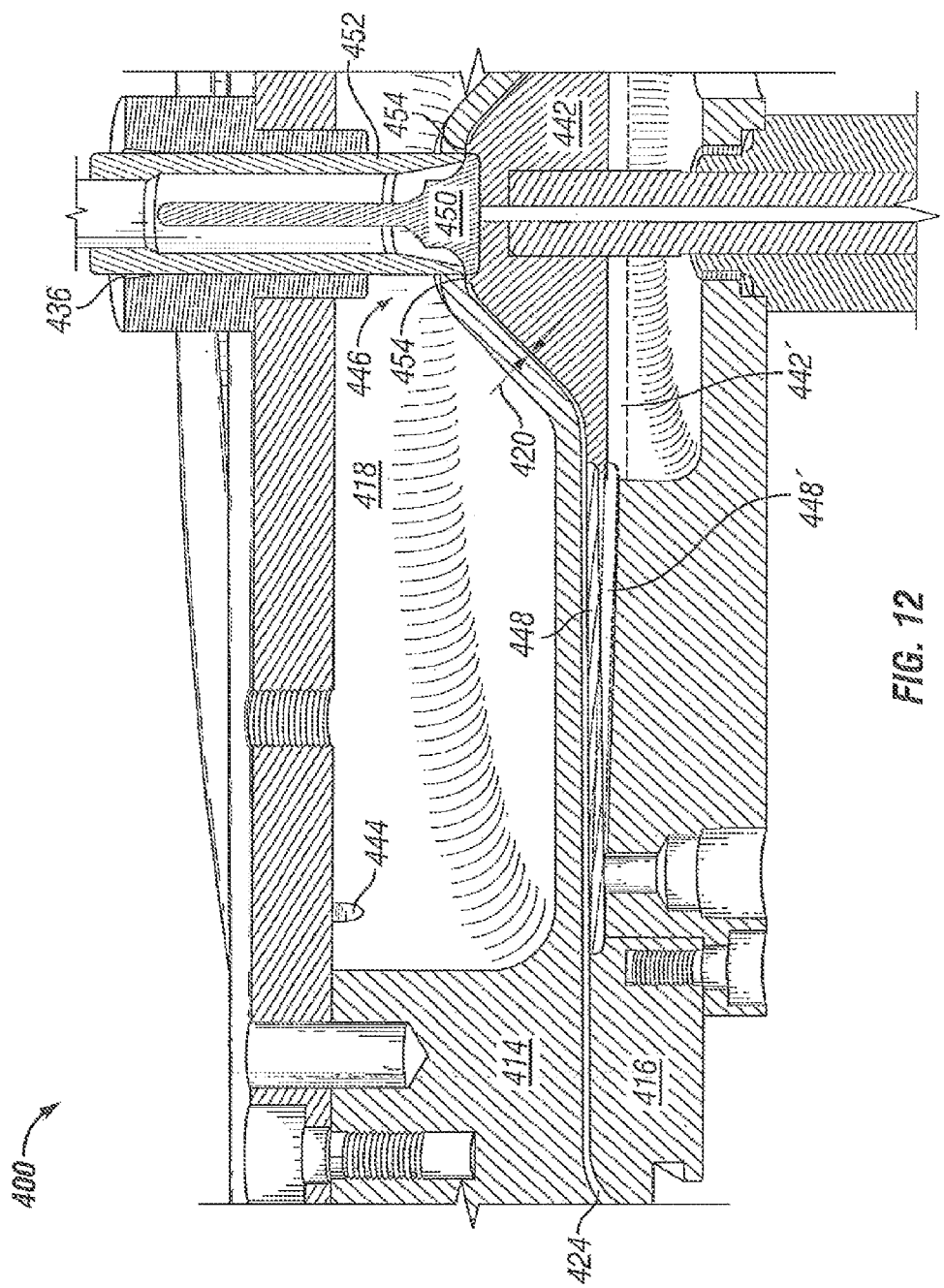
FIG. 12 is an sectional view of a second embodiment of the present invention that uses a plunging nozzle and a diaphragm like valve.

FIG. 12 shows a molding apparatus 400 according to a second embodiment of the present invention. The apparatus includes a two piece injection nozzle 446, which is capable of plunging back and forth in the vertical direction and that is inserted into the apparatus via an injection point 436, a waste reservoir 418 that is located concentrically around the nozzle and above the central hub 404 (shown in FIG. 13) and mold cavity 426 (also shown in FIG. 13), a ramped valve member 442, and a membrane 448 that is made of a cured material that is compatible with the polyurethane used to mold the tire and may be made of the same material. The thickness of the membrane may be 2.6 mm but may vary depending on the application. The membrane is attached to the curved surface of the ramped valve member 442 and to the curved surface of the lower member 416 using it primer for attaching the polyurethane to metal, creating a diaphragm type valve that can move up and down with the ramped valve member (see positions of the valve member 442 and membrane 448 in closed position shown in solid lines while the open position is shown in phantom lines using reference numerals 442' and 448') while preventing the liquid polyurethane from seeping into seams of the apparatus and fouling the equipment, which is difficult to do using traditional seals or gaskets.

A compression spring (not shown) biases the valve member so that its top shut off surface 454 seals against the upper member 414, effectively closing the gate 424 from the runner 420. Of coarse, the runner becomes larger when the valve member 442 is lowered as will be described but there is always a gap between the valve member and the upper member to help ensure the top surface of the valve member 442 shuts off on the upper member 414 that. This spring force may be counteracted to effectuate opening of the valve as will be described. The runner thickness may vary but the inventor has found thicknesses such as 0.5 mm to 1 mm to be suitable depending on the application. Of course, the gate reduces in size to restrict flow into the cavity.

Figure 13:
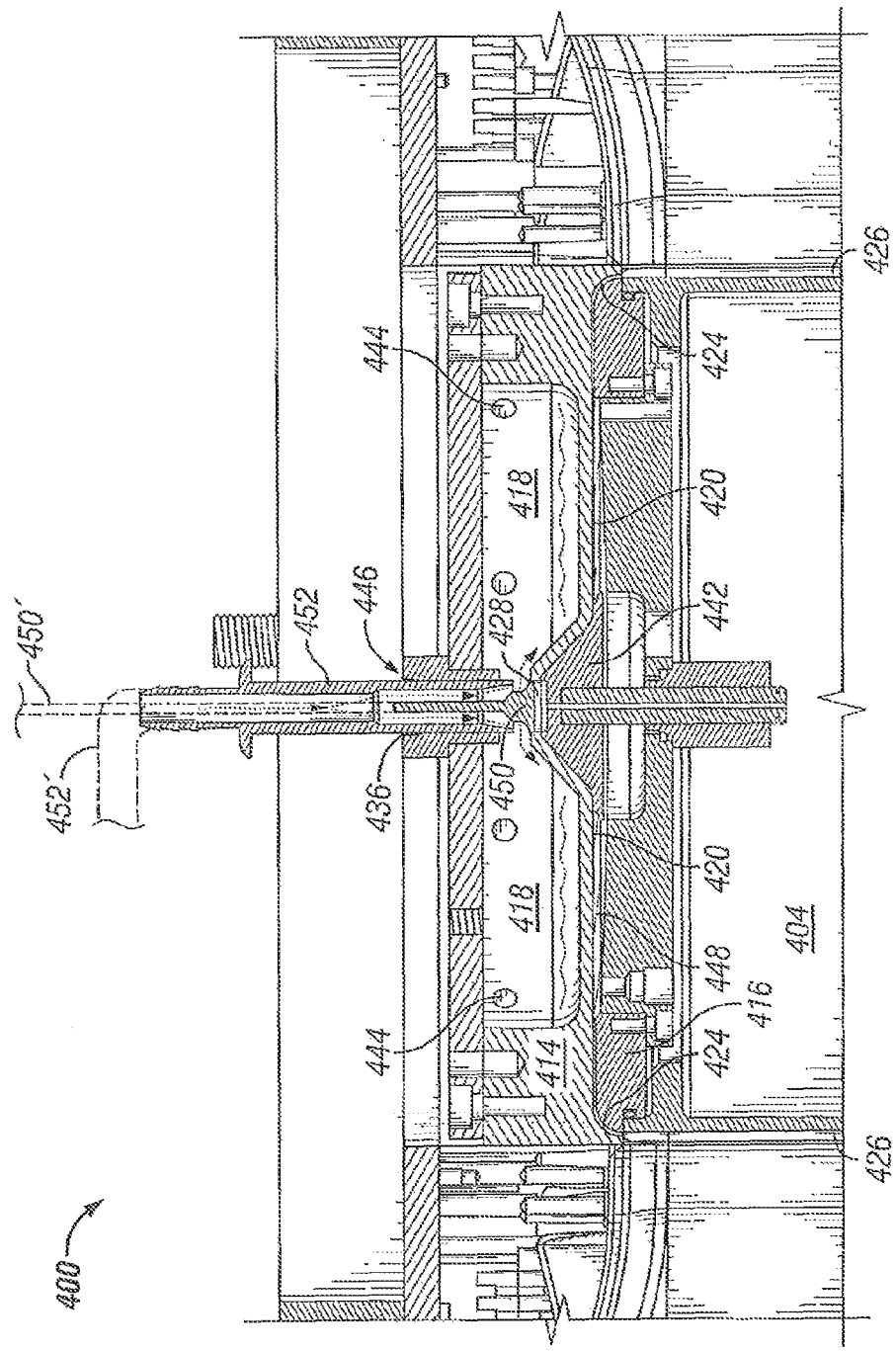
FIG. 13 shows the nozzle of FIG. 12 in a configuration and position that allows the filling of the waste reservoir with poor quality material.

Looking now at FIG. 13, the two piece nozzle 446 comprises a sliding inner member 450 and outer sleeve 452 that is also able to translate independently of the inner member. The first step in the process for this embodiment for filling the mold cavity 426 is for the outer sleeve member 452 to move upward while the inner member 450 is flush with the opening to the passage 428 that connects the waste reservoir 418 to the runner 420, creating an annular opening from the nozzle 446 into the waste reservoir while also blocking any flow into the runner. This allows the poor quality material to fill the basin of the waste reservoir as air vents 444 are provided to allow the displacement of air. This continues until a predetermined amount of material has been injected into the waste reservoir. This can be accomplished using timers, pressure switches, capacitance switches, or temperature sensors that are placed at strategic heights in the waste reservoir, similar to what has already been described for the first embodiment. The inventor refers to this step as partial nozzle insertion for the diversion of material flow into the waste reservoir. The movement of the nozzle can be effected by means commonly known in the art including pneumatic, hydraulic, solenoids, etc.

It is contemplated that in order to achieve independent motion of the outer sleeve 452 and inner member 450 of the nozzle, an alternate configuration shown in phantom lines 452' and 450' in FIG. 13 might be used where the back stem portion extends through top surface of the elbow portion of the outer sleeve and the relative movement of each component may be achieved using means known in the art including rack and pinion, hydraulic, pneumatic and solenoid means. In addition, other means in the art known for moving shut off pins in the molding industry might be employed including the use of guide members for guiding the movement of the pin that have orifices arranged around the periphery of the guide members for allowing fluid to pass by the guide members.

Figure 14:
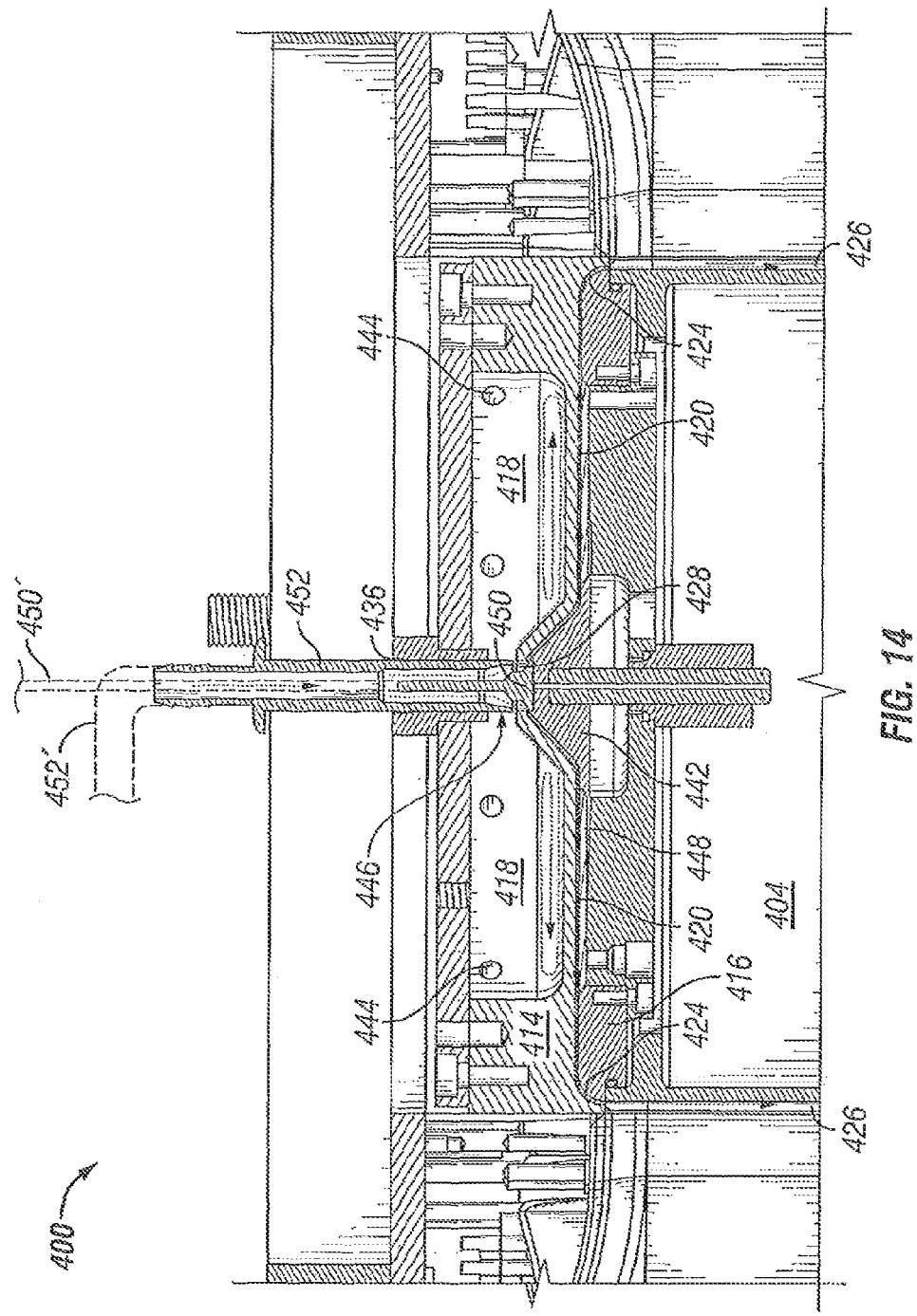
FIG. 14 shows the nozzle of FIG. 12 in a configuration and position that allows the filling of the waste reservoir and passage, runner, gate and mold cavity with good quality material.

As shown by FIG. 14, once enough material has been diverted into the waste reservoir 418, both the inner member 450 and outer sleeve 452 of the nozzle 446 are moved vertically until the annular opening between the waste reservoir and the nozzle is reduced, beginning to pinch off the flow of material into the waste reservoir. At the same time, the inner member 450 of the nozzle pushes down on the valve member 442, overcoming the spring force that biases the valve member closed, resulting in an annular opening between the passage 428 and the nozzle 446, which allows material to start to flow into the runner 420. The timing of movement of the various parts of the nozzle and valve member help to prevent the formation of bubbles in the material as well as avoid any flow hesitation.

Figure 15:
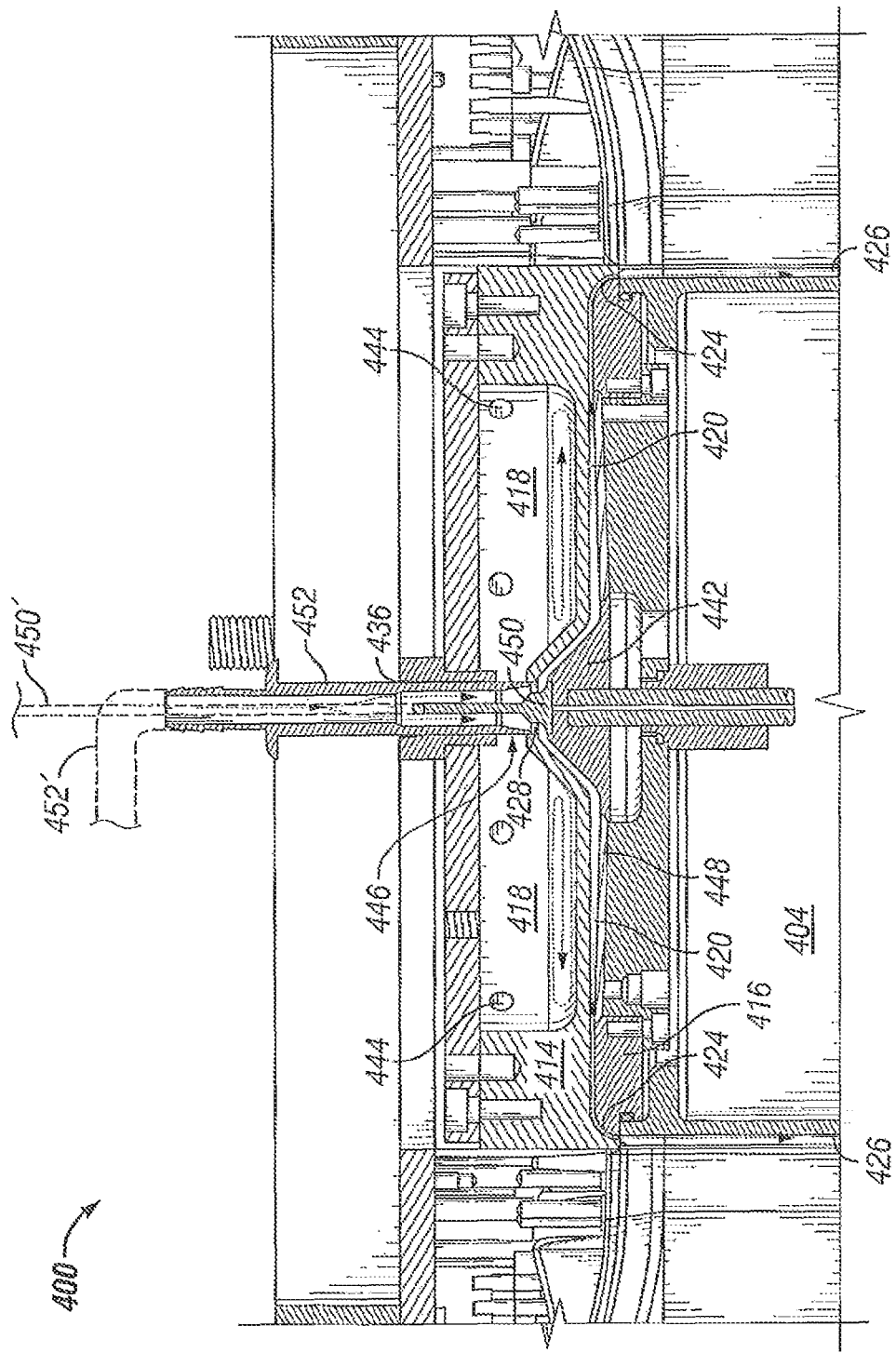
FIG. 15 shows the nozzle of FIG. 12 in a configuration and position, that shuts off the filling of the waste reservoir and allows good material to flow into the passage, runner, gate and mold cavity only.

Next as shown by FIG. 15, the outer sleeve 452 and inner member 450 of the nozzle are advanced to the furthest extent into the apparatus 400, causing the outer sleeve 452 to shut off all flow into the waste reservoir 418 while creating a large annular opening from the nozzle 446 to the passage 428 and runner system 420. The runner would naturally fill in a concentric fashion and would feed the concentrically shaped gate in the same manner, allowing the filling of the spokes and annular bands (designated as mold cavity 426) of the tire symmetrically and consistently. As can be seen, the two piece nozzle and the relative movements of the inner member and outer sleeve allow it to act as a shut off valve that can stop flow into the waste reservoir while also acting as a shut off valve that can open and close the passage to the runner in conjunction with the ramped valve member.

Figure 16:
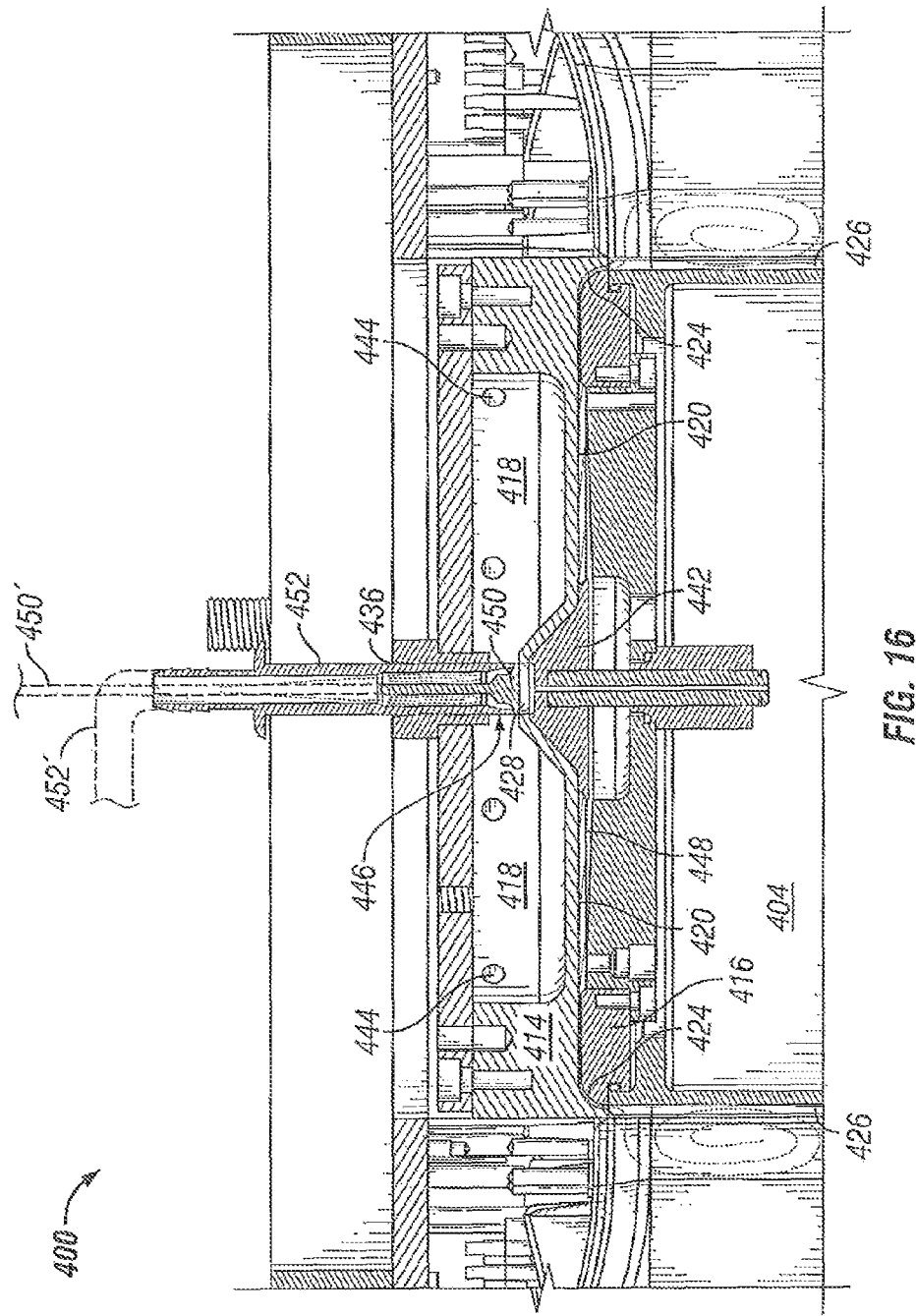
FIG. 16 shows the nozzle of FIG. 12 in a configuration and position that shuts off the filling of the passage, runner, gate and mold cavity after the mold cavity has been filled.

As illustrated by FIG. 16, at the end of the mold fill, the flow of material is stopped by retracting completely the inner member 450 of the of the nozzle 446 to its seated position on the outer sleeve 452, which in turn allows the valve member 442 to close due to the biasing of the spring force, sealing the passage 428 from the runner 420. At the same time, the position of the outer sleeve 452 of the nozzle 446 may remain the same to prevent bad material from leaving the waste reservoir 418 and entering back into the passage 428.

At approximately the same time or slightly after the valve member shuts of the passage from the waste reservoir to the runner, the nozzle is shut off as the inner member impinges upon the outer sleeve. Also, the membrane forces some remaining material from the runner through the gate into the cavity, reducing the amount of waste material. Before the material is cured, the nozzle may be flushed with solvent to ready it for the next cycle or shot. Material found in the waste reservoir then needs to be removed manually. Likewise, the material found in the gate resembles an umbrella that extends radially inward along the circumference of the inner annular band of the tire and needs to be trimmed from the tire. It is contemplated that this apparatus could be automated so that the tire as well as the feed system after each cycle or shot could be removed or ejected automatically.

For this embodiment, the material found in the waste reservoir and gate as well as the tire itself could be extricated from each other and the apparatus in a manner similar to that used in a conventional three plate style mold used in the injection molding industry. As with the previous embodiment, the configuration, sizing and relative placement of the various voids to each other as well as the type of nozzle, such as its construction, whether single piece or multi-piece, as well as the timing of the filling steps and ways of accomplishing them may be modified to suit the application. For example, it is contemplated that a single piece nozzle that plunges could be used to first fill the waste reservoir before a valve is opened to allow material to fill the runner, gate and mold cavity.

Figure 17:
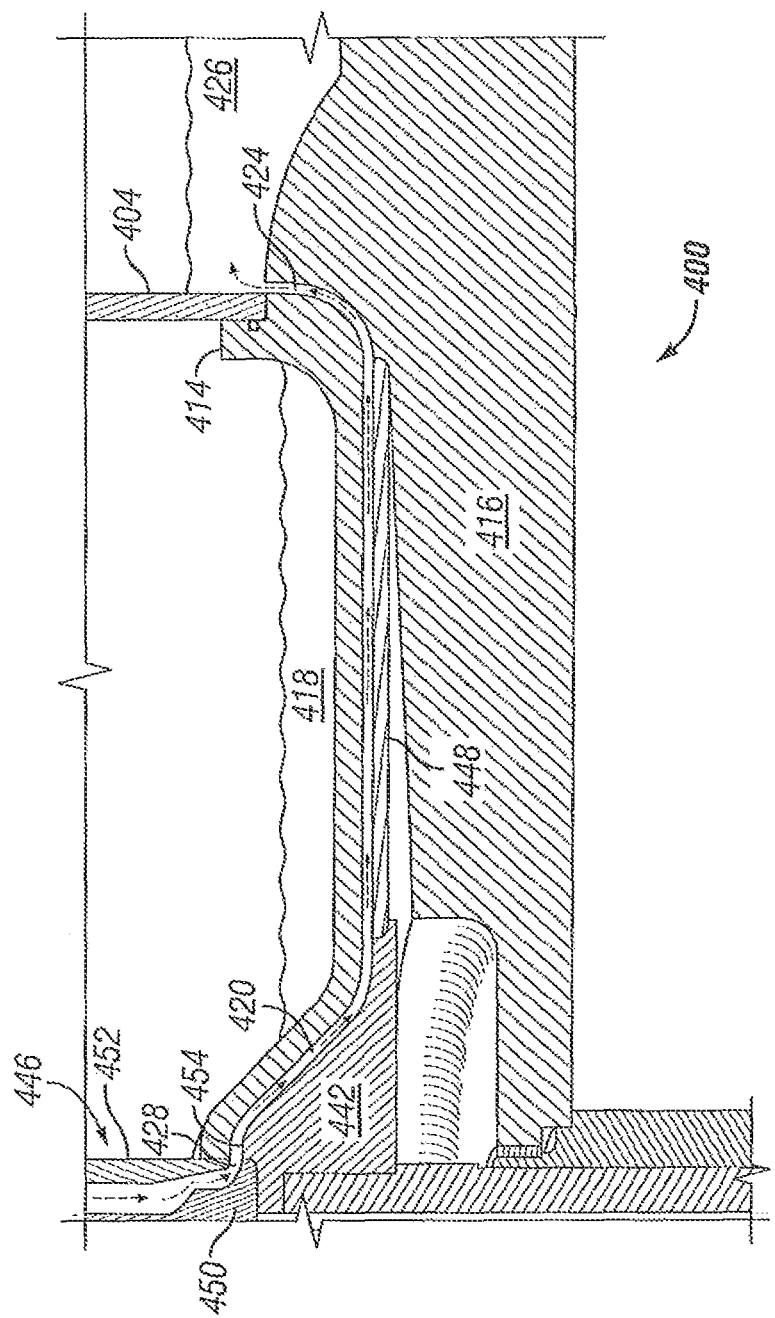
FIG. 17 shows an alternate bottom fill option for the second embodiment of the present invention where the nozzle plunges from the top side of the molding apparatus.
Figure 18:
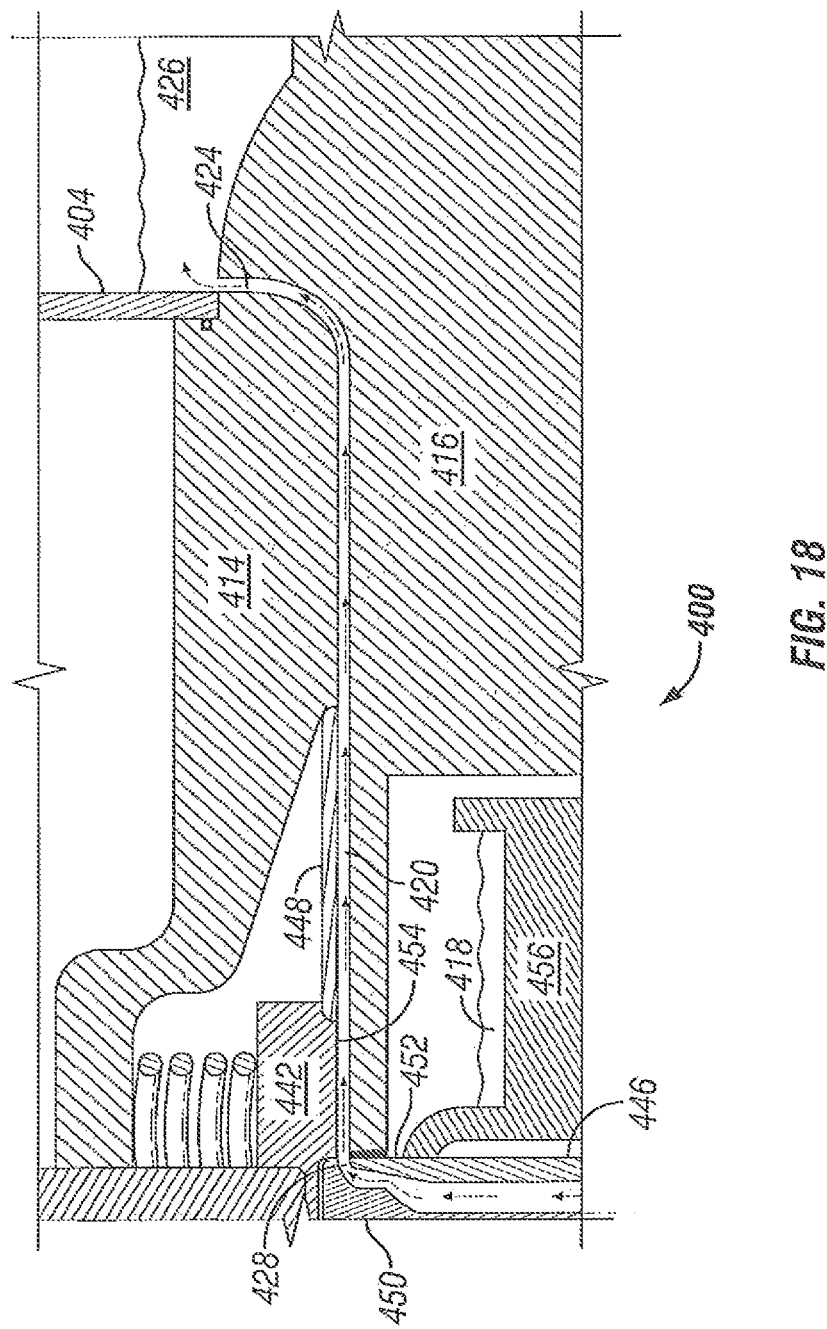
FIG. 18 illustrates yet another bottom fill option for the second embodiment of the present invention where the nozzle plunges from the bottom side of the molding apparatus.

FIG. 17 shows a bottom fill version for this embodiment and works essentially the same way except with the nozzle 446 plunges from above the molding apparatus 400. All other components as well as the movements of the nozzle 446 and its various parts work the same. The essential difference is that the runner 420 curves upward into the gate 424 and that the placement and configuration of the waste reservoir 418 is changed such that it is located near the bottom of the molding cavity 426. On the other hand, FIG. 18 depicts a bottom fill version for the second embodiment that is essentially the same as FIG. 17 except that the nozzle 446 plunges in the upward vertical direction to effectuate opening of the valve member 442 and the components of the nozzle 446, ramped valve member 442 and membrane 448 have an orientation that is rotated 180 degrees about a horizontal axis as compared to any of the other versions of the second embodiment discussed thus far. Also, an additional component that acts as the basin 456 for holding waste material is provided that is found below the molding cavity 426.

For any of the embodiments, it is further contemplated that the nozzle could have the ability to plunge but that the inner member and outer sleeve would not have the ability to translate relative to each other as would be the case when the inner member is press fit into the outer sleeve. In such a case, more turbulence in the flow might be created as die flow to the waste reservoir is pinched off and the flow to the runner is increased. Also, some slight dripping make occur when moving the nozzle to a drum to be flushed between molding cycles. In other words, the term plunging nozzle means that the outside housing of the nozzle is capable of moving along an axis so that fluid communication may be established between the nozzle and one or more voids of the feed system.

While only a tread that is formed with spokes that is part of a non-pneumatic tire has been specifically described herein, it is contemplated that this process could be used with tires that use a gas along with spokes (often referred to as a hybrid tire) to support the load applied to the tire. The tire does not need to be configured with a shear layer or have other properties or features as the tire contained in U.S. Pat. No. 7,201,194. Also, other materials may be used instead of polyurethane such as any thermosetting material that is suitably durable and strong to support the loads applied to the tire. Furthermore, the embodiments discussed herein focused on adding spokes to the tire but the present invention is also applicable to forming other regions of a tire. Testing of both embodiments has indicated that both solutions are suitable to provide good quality material to the mold cavity without introducing poor quality material to a reasonable degree.

While this invention has been described with reference to particular embodiments thereof, it shall be understood that such description is by way of illustration and not by way of limitation. For example, a vertical molding press has been described but it is contemplated that a horizontal molding press could also be used. In like fashion, the mold has been described as having a cylindrical shape, but it could have other shapes such as a square or rectangular cube. Also, this invention could be used on other articles of manufacture in addition to tires and these articles could have shapes other than cylindrical or circular. Furthermore, the dimensions and configurations of the features of the embodiments of the present invention may be modified or optimized to suit the application.

Finally, different aspects and features of some of the embodiments discussed herein may be substituted for other features of other embodiments to yield farther embodiments as has been already mentioned. Accordingly, the scope and content of the invention are to be defined only by the terms of the appended claims.

What is claimed is:

1. A method for manufacturing an article comprising:
providing an apparatus with structural members that define voids including a mold cavity, a feed system that includes an injection point, waste reservoir, a runner, a passage that connects the waste reservoir to the runner, and a gate that connects the runner to the mold cavity;
characterized in that
the waste reservoir is found radially inside the runner and the gate;
the injection point is capable of initially introducing fluid into the waste reservoir and subsequently through the passage into the runner; and
fluid is capable of flowing through the runner and entering the mold cavity via the gate;
by injecting fluid material into the waste reservoir until it is partially filled;
generating a signal that indicates when the waste reservoir has been partially filled;
closing an air vent after said signal, indicating that the waste reservoir has been partially filled, has been generated;
and
stopping the filling of the waste reservoir before it is completely filled.

2. The method of claim 1, which further comprises providing fluid communication between the waste reservoir and runner before the waste reservoir has been completely filled.

3. The method of claim 2, which further comprises providing the air vent near the end of the waste reservoir.

4. The method of claim 3, which further comprises providing a shut off valve which is operatively associated with passage for opening and closing the passage.

5. The method of claim 1, which further comprises opening the valve that is operatively associated with the passage for allowing fluid communication between the waste reservoir and the runner.

6. The method of claim 5, wherein said opening the valve operatively associated with the passage occurs before said closing the air vent helping to prevent flow hesitation.

7. The method of claim 6, which further comprises generating a signal that indicates when the mold cavity is filled.

8. The method of claim 7, which further comprises shutting off the valve operatively associated with the passage to prevent flow back from the mold cavity into the gate.

9. The method of claim 8, which further comprises providing a shut off nozzle for placement in the injection point.

10. The method of claim 9, which further comprises shutting off the nozzle after said shutting off the valve operatively associated with the passage has been accomplished.

* * * * *